Feb. 24, 1959  W. M. HALLIDY  2,875,356
BRUSH HOLDER
Filed April 24, 1957

INVENTOR.
WILLIAM M. HALLIDY
BY Hudson, Boughton,
Williams, David & Hoffmann
ATTORNEYS

United States Patent Office 2,875,356
Patented Feb. 24, 1959

2,875,356

BRUSH HOLDER

William M. Hallidy, Lakewood, Ohio, assignor to The Leece-Neville Company, Cleveland, Ohio, a corporation of Ohio Application April 24, 1957, Serial No. 654,949

2 Claims. (Cl. 310—245)

This invention relates to a brush holder for use in dynamo electric machines or the like, and more particularly, to a brush holder which comprises a pair of members, each being formed in a similar manner and identical in configuration.

It is a primary object of the present invention to provide a brush holder for use in a dynamo electric machine, or the like, which comprises a pair of substantially identical members disposed in complemental abutting relation and forming a brush well or guideway.

Another object of the present invention is the provision of a novel brush rigging for use in a dynamo electric machine, or the like, comprising a support having spaced projections, and a brush holder having a guideway in an intermediate portion thereof and end attaching portions connected with said projections for supporting the brush holder in a suspended relation therebetween.

Another object of the present invention is the provision of a brush holder for use in a dynamo electric machine, or the like, as is characterized above, which is secured at its ends to said machine such that the brush guideway is suspended therebetween and positioned radially outwardly of the axis of the rotor so that a brush supported therein may be utilized for either direction of rotation of said rotor.

Still another object of the present invention is the provision of a brush holder for use in a dynamo electric machine or the like, as characterized above, and wherein each of the identical members is preferably formed by a stamping process such that only one set of forming tools or dies is required.

Additional objects and advantages of the present invention will be obvious upon reference to the following disclosure of a preferred embodiment and as illustrated in the accompanying drawings, which form a part of this specification and wherein.

Figure 3:
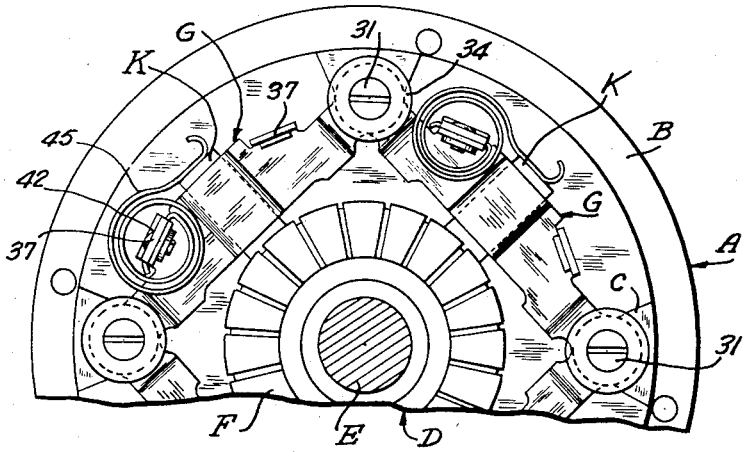
Figure 4:
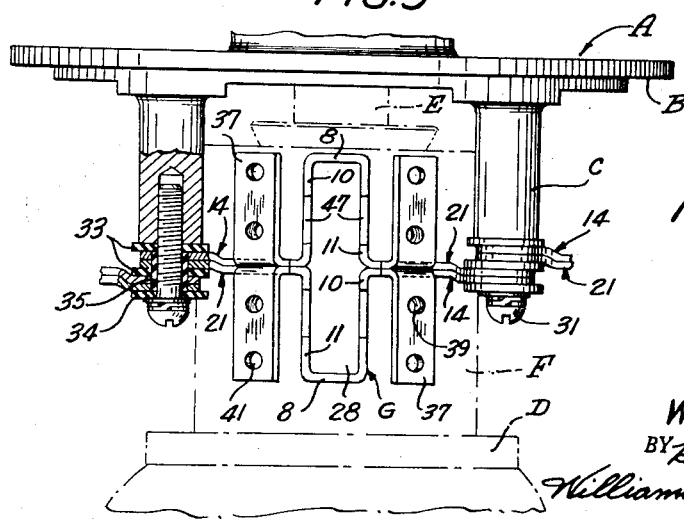

Fig. 3 is a fragmentary, transverse elevational view of a dynamo electric machine, and shows a preferred form of brush rigging with a plurality of brush holders of the present invention mounted thereto and each supporting a brush, and with the latter engaging the commutator; and Fig. 4 is a fragmentary plan view of the dynamo electric machine of Fig. 3 and shows a preferred arrangement for mounting several brush holders embodying the present invention in a staggered relation and with the rotor of the machine structure being shown in dot-dash lines to indicate its relationship with the brush holders.

The brush holder of the present invention comprises, in general, a pair of stamped members, substantially identical in configuration and which are placed one against the other so as to form a brush guideway or well. The members are also integrally provided with leg portions adapted to be attached to the frame of a dynamo electric machine in such manner as to suspend the brush guideway or well centrally therebetween and also to position the latter radially outwardly of the end of the shaft which mounts the commutator.

More specifically, and with reference to the drawings wherein like parts are designated by the same reference characters, the brush holder in the instant form comprises a pair of elongated bracket-like members 5 formed of a suitable metallic material, being identical in configuration and fabricated preferably by a stamping process or the like, whereby only one set of forming tools or dies is required. Each of said bracket-like members includes a substantially, rectangular-shaped, box-like portion 6 comprising an end wall 8 and side walls 10 and 11 integrally provided on opposite ends of the latter and depending perpendicularly therefrom, forwardly of said end wall in substantially parallel-spaced relationship to each other, defining an open-end recess 12 therebetween. To the forward end of the side wall 10 is integrally formed a leg element 14, which extends substantially perpendicularly outwardly therefrom and in parallel spaced relationship to the end wall 8. The free end portion 16 of the leg element 14 is offset rearwardly of the intermediate flat part 17 of the latter and extends outwardly therefrom in parallel spaced relationship and is interconnected thereto by means of a forwardly inclined wall 19 defining a shoulder 20 therebetween.

In like manner, the forward end of the side wall 11 is also integrally provided with a leg element 21, which extends substantially perpendicularly outwardly therefrom and in parallel spaced relationship to the end wall 8. However, the free end portion 23 of the instant leg element 21 is offset forwardly of the intermediate flat part 17 of the latter and extends outwardly therefrom in parallel spaced relationship and is interconnected thereto by means of a rearwardly inclined wall 24 defining a shoulder 25 therebetween.

Figure 1:
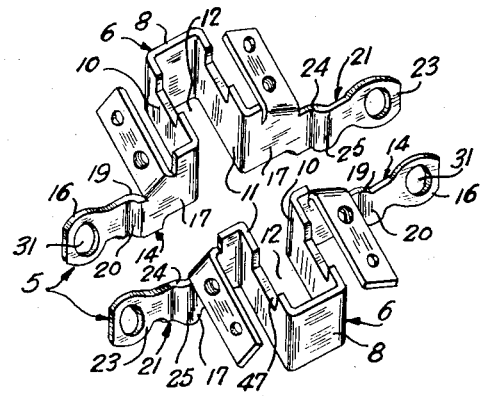
Fig. 1 is a perspective view showing a pair of substantially identical bracket-like members in a slightly spaced relationship, prior to their being placed together to form a brush holder embodying the present invention.
Figure 2:
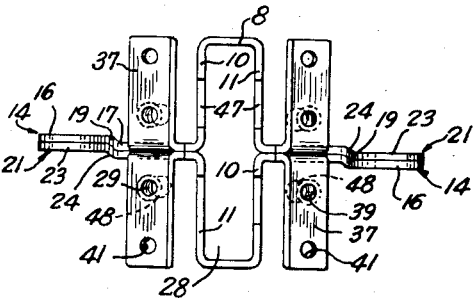
Fig. 2 is a plan view showing the bracket-like members of Fig. 1 in a complemental abutting relationship forming the brush holder of the present invention.

As previously mentioned, the bracket-like members 5 are placed one against the other in a complemental abutting relationship to form the brush holder of the present invention. In order to clearly described the method of assembly and the relationship between the above described elements of said members, let it first be assumed that the latter are lying in a straight line with the leg element 14 of one member adjacent to the leg element 21 of the remaining member, such that the open end of the box-like portion 6 on each member faces in the same direction. With this placement in mind, one of said members is then pivoted or swung about its last mentioned leg element approximately 180° to a position as shown in Fig. 1, wherein the leg element 14 of one member lies directly opposite to the leg element 21 of the other member and the open ended box-like portions 6 on said members are directly opposed and face toward each other. And, while maintaining this relative disposition of elements, one of the bracket-like members is moved toward and into abutting engagement with the other, as shown in Fig. 2, so that the forwardly inclined wall 19 on the leg element 14 lies over and against the rearwardly inclined wall 24 on the leg element 21 of each member 5 in a substantially nested relationship. In this manner the intermediate flat parts 17 on the leg elements of one member 5 lie against their respective counterparts on the other of said members and the shoulders 20 and 25 defined by the aforesaid inclined walls 19 and 24, are effective to properly position the box-like portions 6 on each member in a directly opposed relationship so as to form a tubular brush guideway or well 28.

The brush holder, assembled in the manner just described, is adapted to be mounted in a dynamo electric machine and for this purpose an aperture 31 is provided on the offset end portions 16 and 23 of each member 5, which are brought into alignment with each other upon the assemblage of said members and which receive suitable fasteners, such as a bolt or the like, which, in turn, are threadably secured to the dynamo electric machine. The apertured end portions 16 and 23 thus provide attaching eyelets on the outer ends of the oppositely extending leg elements 14 and 21 of the complemental members 5. Merely for purposes of illustration, a brush rigging for a dynamo electric machine utilizing four brushes on its commutator and thereby requiring the use of four brush holders of the present invention is shown in Figs. 3 and 4 and will be described in considerable detail; however, it is not meant to define any limitations of its use, it being clearly understood that the brush holder of the present invention is applicable to various forms of structure having different configurations and relationship of parts than as will be herein described.

Referring now to the drawings, the dynamo electric machine A is provided with a brush rigging which includes a cylindrical frame B having a plurality of radially spaced bosses C on its inner face and placed approximately 90° apart. The frame B may be an integral part of the stator housing, or, as in the instant form, may be a separate member to which the brush holders are mounted and then attached to said housing. The dynamo electric machine also includes the usual rotor D rotatably supported centrally in the frame and having a shaft E concentrically mounting a commutator F. The brush holders G being four in number as previously mentioned, are placed on the frame B with the brush guideway of each centrally spaced between adjacent bosses, and the offset portions of the leg elements 14 and 21 are then attached to said bosses by suitable fasteners such as screws 31. As shown particularly in Fig. 4, each boss mounts one leg element from each of two adjoining brush holders and the latter are originally placed on the frame such that the leg elements which have oppositely inclined offset portions are mounted on the same boss. Also the leg elements on opposite ends of each brush holder are mounted on adjacent bosses such that one leg element lies on top of the leg element of the adjoining brush holder, while the opposite leg element lies underneath the leg element of its adjoining brush holder. Additionally, the leg elements mounted on each boss are insulated from the latter and from each other by suitable mounting pads 33, and in like manner are also insulated from the screw 31 by means of mounting pad 34 and a bushing 35, the latter extending through the aperture 31 in each leg element and surrounding the shank of said screw. With this mounting arrangement or interleaving of leg elements of adjoining brush holders, a minimum of mounting pads is required, and it also enables the placement of said brush holders in a predetermined position relative to the longitudinal axis of the commutator such that the full axial length of the latter is utilized for commutation.

A suitable brush K is placed within the brush guideway or well 28 of each brush holder and is adapted to be biased into pressure engagement with the commutator. For this purpose, each bracket-like member 5 is integrally provided on the top surface of each flat intermediate part 17 with an elongated rectangular lug 37 which extends perpendicularly therefrom and rearwardly of its associated leg element 14 or 21, being adjacent to the box-like portion 6 and in substantial parallel-spaced relationship to the side walls of the latter. A spring member 45, which in the instant form is shown to be a coil spring, merely for purposes of illustration, has its one end attached to one of the lugs 37 by means of a suitable fastener such as screw 42 mounted in a threaded hole 39, whereas its opposite end extends over the brush guideway and bears against the top of the brush K carried therein to bias the latter into pressure engagement with the commutator. Additionally, each of the side walls 10 and 11 of the bracket-like members 5 may be provided with suitable grooves 47, whereby the brush engaging end of the spring member 45 may continue to bear against the brush as the latter becomes worn and moves downward into the brush guideway. Also, the usual brush conductor or wire, not shown, may be connected into electrical circuit with its associated elements of the dynamo electric machine by interconnecting the same to one of the lugs 37 by means of a suitable fastener secured in an aperture 41 provided in said lug. Or, if desired, a boss 48, Fig. 2, may be integrally formed on the underside face of the lug, surrounding the hole 39, whereby a sufficient number of threads may be formed therethrough to enable said brush conductor and associated circuit elements to be also attached to said lug by the aforesaid screw 42.

From the foregoing description it is now apparent that the present invention provides a novel and improved brush holder comprising two identical stamped bracket-like members, which, when placed together in a complemental opposed relationship, form a brush guideway or well between oppositely extending leg elements. Additionally, it is apparent that since the two bracket-like members are substantially identical in configuration, they may be fabricated by stamping or the like from a single set of forming tools or dies. Also, it is realized that the leg elements of the brush holder of the present invention, when mounted on the brush rigging and attached to a dynamo electric machine in the manner as described, suspend the brush guideway or well in an axially spaced relationship to the commutator of said machine, whereby a brush carried therein may be used for either direction of rotation of the rotor. Further, it is realized that the offset portions of the leg elements of the brush holder enable the latter to be mounted to the brush rigging of the dynamo electric machine with a minimum of parts, and also enable the full axial length of the commutator to be used. It is also realized that the brush guideway or well of the brush holder is suspended between the oppositely extending leg elements such that the cantilever effect of the brush spring is substantially reduced.

Having thus described a preferred embodiment of the present invention, it is understood that the same is susceptible of various modifications without departing from the scope of the appended claims.

Having thus described my invention, I claim:

1. A brush holder for a dynamo electric machine; comprising a pair of complemental stamped sheet metal members of substantially identical configuration; each of said members comprising a formed intermediate portion, and a pair of legs connected with said formed intermediate portion and extending in opposite directions from the latter and including eyelet portions at the outer ends of said legs; the formed intermediate portion of each member having a recess therein including an opening communicating with the recess and lying in the plane of the legs of the member; said members being disposed with the legs thereof in face-to-face engagement and with the recesses of the members in an aligned communicating relation defining a tubular guideway adapted to receive a brush; said legs having transversely offset portions forming shoulders thereon between the eyelet portions and the formed intermediate portions of said members; the shoulders of one member being in an opposed relation and interfitting engagement with the shoulders of the other member for maintaining said recesses in said aligned relation.

2. A brush holder as defined in claim 1 and which also comprises lug means formed by bent integral projection portions of the legs of said members; the lug means of each member being joined thereto at a point between said formed intermediate portion and an eyelet portion, and being disposed in a projecting angular relation to the plane of the legs of the member so as to extend away from the other of said members.

References Cited in the file of this patent

FOREIGN PATENTS 822,859    Germany ---------------- Nov. 29, 1951